UNITED STATES PATENT OFFICE.

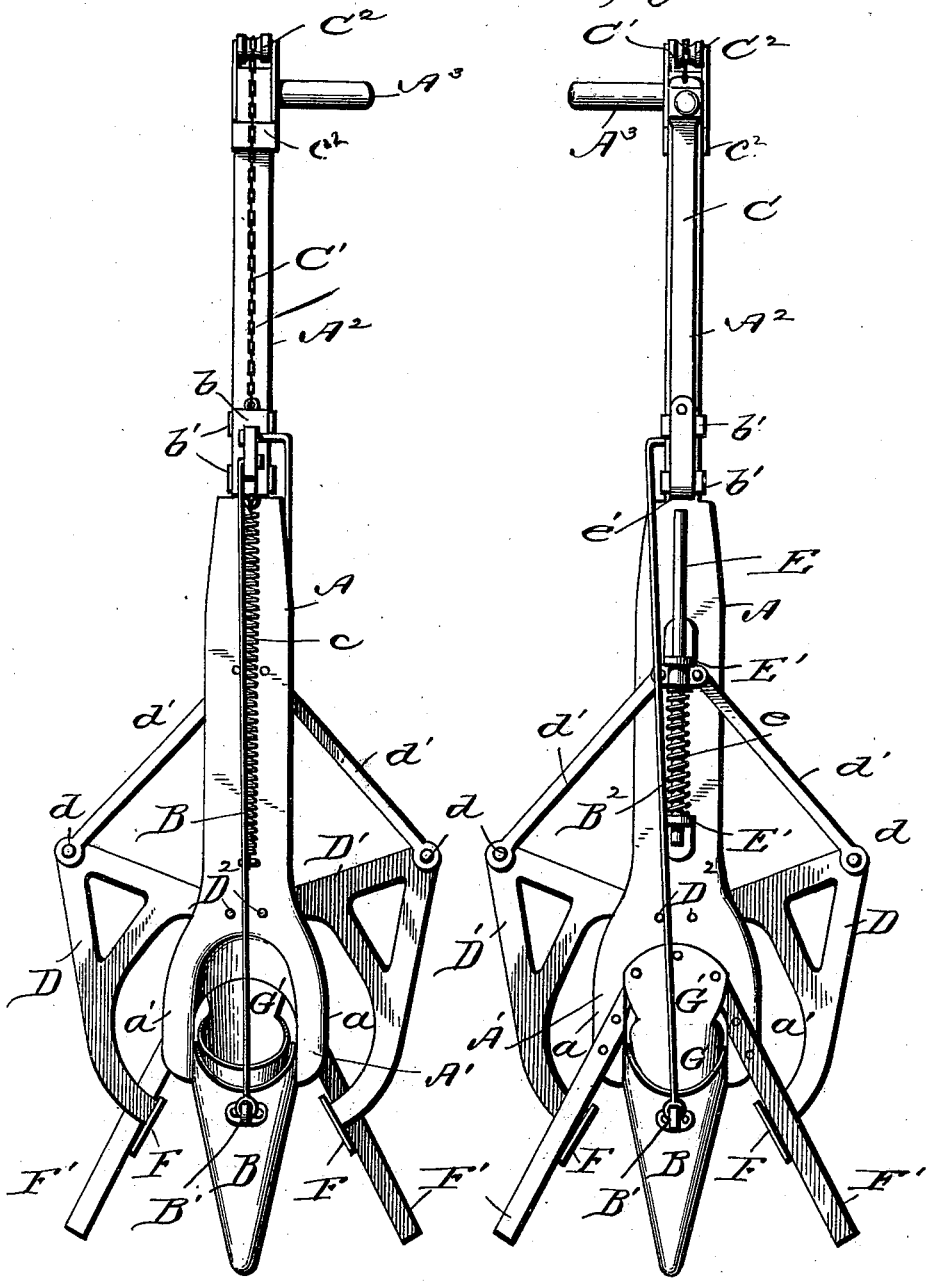

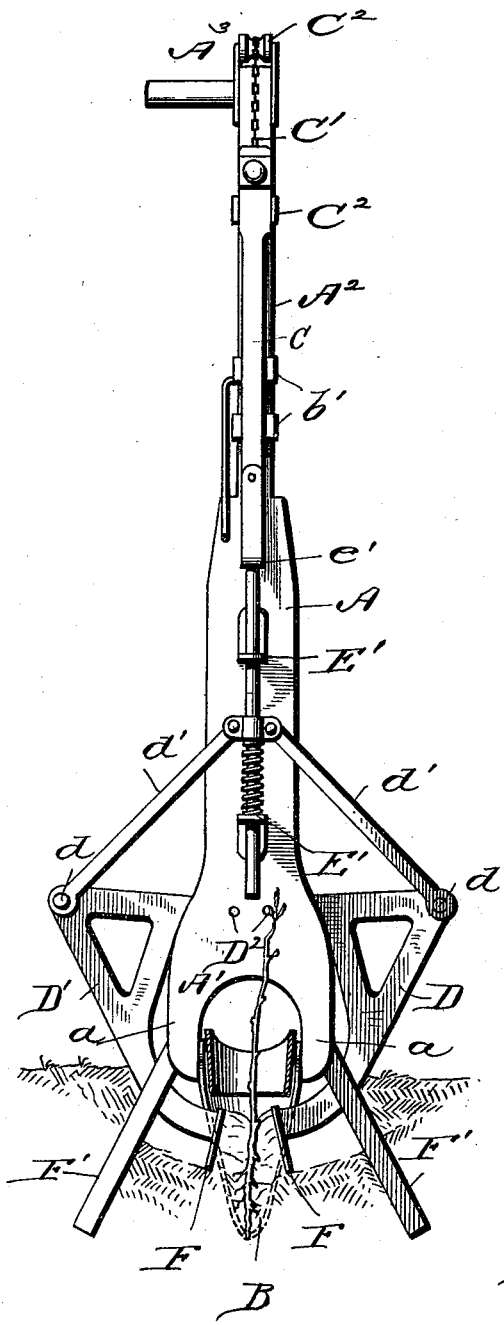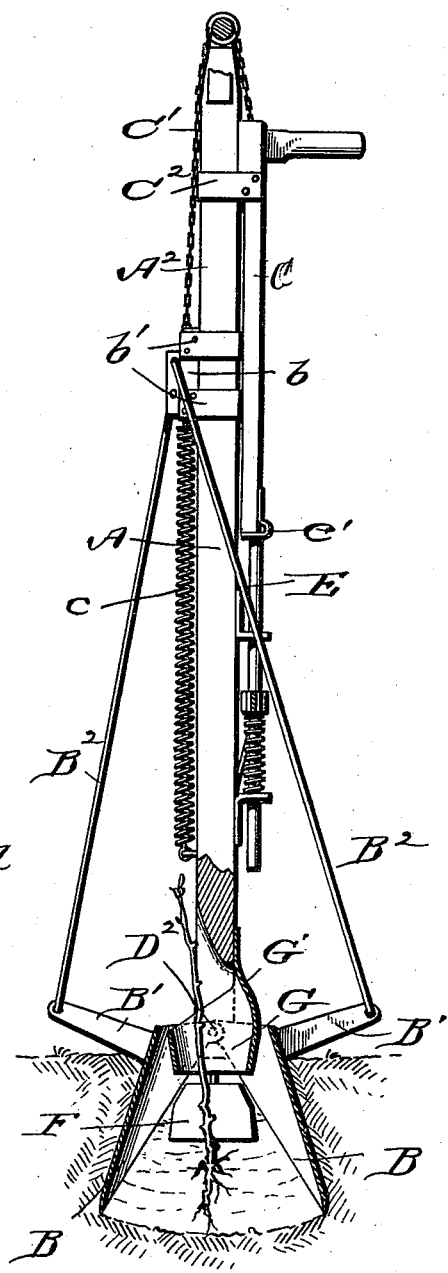

JOHN W. MORGAN, OF HARRIMAN, TENNESSEE.

TRANSPLANTER.

SPECIFICATION forming part of Letters Patent No. 516,274, dated March 13, 1894.

Application filed October 11, 1893. Serial No. 487,881. (No model.)

*To all whom it may concern:*

Be it known that I, JOHN W. MORGAN, a citizen of the United States, residing at Harriman, in the county of Roane and State of Tennessee, have invented certain new and useful Improvements in Transplanters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in that class of transplanters wherein a pair of spoon-shaped sections are pivoted or hinged so as to swing toward and from each other, and to form a hollow hole-forming pin adapted for the reception of the plants and to be pushed into the earth and then opened, thereby depositing the plant in the hole formed by the pin; and the invention consists in certain improvements whereby the device is rendered more efficient and durable. Also by my invention the plant when deposited in the ground is simultaneously packed and set by the action of devices provided for that purpose, all of which will be fully described hereinafter and pointed out in the claims.

Referring to the accompanying drawings for a complete disclosure of my invention: Figure 1 represents a side elevation of my complete arrangement; Fig. 2 a similar view taken from another side of the device; Fig. 3 a section on line I—I of Fig. 1; and Fig. 4 a view showing the method of operating the invention.

The reference letter A indicates the body or main portion of the apparatus which is composed of a beam of wood and provided at its lower end with a bifurcated portion A', while its upper end $A^2$ is considerably reduced in size and provided with a handle $A^3$ by which the machine is held. The bifurcated portion A' is formed so that its two arms $a, a'$ will project a distance from each other equal to the breadth of the plant operated upon and have pivoted to their ends one side of the semicircular pin sections B. These sections are two in number and being duplicates of each other, form, when in engagement, a tapering or conical hollow pin, by which an opening is made in the earth to receive the plant. Formed integral with or rigidly secured to each of the sections B are the arms B' which project outwardly therefrom and are in turn connected at their ends to the rods $B^2$. These rods extend upwardly until the reduced portion $A^2$ is reached, where they are connected to the sliding block $b$. This block is arranged on one side of the reduced portion $A^2$ and provided with the bands $b'$ which embrace the said reduced portion and thereby connect the block to the standard so that it will be free to slide on the reduced portion. By means of a suitable spring $c$ connected to the sliding block $b$, and to the body A near its lower end, the said block is given a normal tendency to move toward the lower end of the reduced portion and carrying with it the connecting rods $B^2$, keep the jaws constituting the pin B closed. This is their normal condition.

Connected to the block $b$, and extending upwardly therefrom to the highest point on the body is a cord or chain C' which operates over a pulley $C^2$ journaled in said highest end and from this point the cord or chain C' extends downwardly for a slight distance and is connected to the reciprocating operating rod C. This rod is provided with a band $c^2$ similar to the bands $b'$, which band embraces the reduced portion $A^2$ of the body in a manner which will allow the rod to reciprocate on the reduced portion. The normal position of the rod C is that shown by full lines in Fig. 2, viz: far enough upon the reduced portion to make the band $c^2$ engage with handle $A^3$, the rod being long enough to extend the whole length of the reduced portion. It will be apparent that upon reciprocating the rod the cord or chain C' will be drawn over the pulley $C^2$ and cause the block $b$ to move up the reduced portion and that this operation will be followed by the downward movement of the rod E and a consequent opening or disengagement of the pin section B.

The reference letters D and D' each indicate an arm or bell-crank which is triangular in shape and pivoted to the lower end of the body at $D^2$. The highest angle $d$, of each bell-crank is pivotally connected to the arms $d'$, which extend upwardly and forward of each other and are connected at their upper ends to the reciprocating rod E, which is mounted in boxes E' and which extends parallel with the body A and in longitudinal alignment with the bar C. The rod or bar E is provided with a spring e, arranged between the two boxes E' and which is adapted to give the rod a normal tendency upward so that its upper end will occur a short distance below the lower end of the bar C, the latter bar being provided with an enlarged lower end e', which is adapted to engage with the band rod E as will appear more fully hereinafter. The remaining angle of the bell-cranks D and D' are bent or curved inwardly toward the pin B where they are provided with a plate F, secured rigidly and extending at right angles thereto. These plates are normally located directly adjacent to the pin B, and have by reason of the spring e, a continual tendency to swing away from such pin, the accomplishment of which is prevented by the rigid arms F' secured to the body near its lower end and projecting downwardly and outwardly so as to engage with the plates F and limit their outward movement.

Secured to the body A at the point A' and arranged between the arms of the bifurcated portion is a funnel-shaped plant holder G. This plant holder is secured to the body by means of an arm G' and is arranged within the hollow pin B. The arm G' is formed preferably integral with the plant holder and is of such a size as to entirely fill the space between the arms of the bifurcated portion on that side to which it is secured, the other side, however, being left open to permit the easy entrance of the plant.

In using my invention as a transplanter, the plant to be planted is first inserted in the holder G, through the open side referred to, so that its roots will lie partially in the holder and partially in the hollow pin B. This pin is then pushed into the ground and when far enough in, the rod C is moved downward. This operation is followed, first by the upward movement of the block b, and a consequent disengagement of the sections of the pin B causing it to open partially; and second, when the rod C has traveled about one-third of its stroke, by the engagement of the head e' and the upper end of the rod E which will cause the bell-cranks D and D' to oscillate on their fulcrums and the plates F to be advanced toward each other and into the space between the now entirely open pin B. When the pin B is pushed in the ground an opening is formed therein, and when the pin is opened the plant is allowed to remain in the opening in which it is carried by the pin. Now as the plates F come together the ground around the opening is carried toward the plant and packed firmly around it, thereby completing the operation. The apparatus is then withdrawn from the ground.

Having thus described my invention, what I claim as new, and desire to secure by Letters Patent, is—

1. In a transplanting apparatus, the combination of a hollow hole-forming pin, adapted to contain the plant, and formed of sections normally closed, rods connected to the sections, and a sliding block to which the rods are also connected, the said block being adapted to be reciprocated so as to open and close the sections and to deposit the plant in the hole formed by the pin, substantially as described.

2. In a transplanting apparatus, the combination of a hollow hole-forming pin, formed of sections normally closed, and adapted to hold the plant, rods connected to the sections, a sliding block to which the rods are connected, a pair of dirt packing devices operating with the hollow pin and adapted to be normally out of engagement with the pin when closed, arms connected to the packing devices, a reciprocating bar to which the rods are also connected, and a second reciprocating bar in connection with the sliding block and adapted to engage, when moved, with the first reciprocating bar, whereby the pin is first opened and the plant deposited in the hole formed by the pin, and then the packing devices advanced and operated to pack the dirt around the plant, substantially as described.

In testimony whereof I affix my signature in presence of two witnesses.

JOHN W. MORGAN.

Witnesses:
  GEORGE VANDERPILE,
  JAMES BLAIR.